United States Patent [19]

Kashihara et al.

[11] Patent Number: 4,968,290
[45] Date of Patent: Nov. 6, 1990

[54] STEPLESS SPEED CHANGE TRACTION GEAR

[75] Inventors: Tadashi Kashihara; Kikuo Okamura; Yasushi Kitazaki, all of Kyoto, Japan

[73] Assignee: Shinpo Kogyo Kabushiki Kaisha, Kyoto, Japan

[21] Appl. No.: 382,319

[22] Filed: Jul. 20, 1989

[30] Foreign Application Priority Data

Jul. 23, 1988 [JP] Japan .................. 63-184072

[51] Int. Cl.[5] .................. F16H 15/50
[52] U.S. Cl. .................. 475/193; 74/191
[58] Field of Search .................. 74/191, 796; 475/190, 475/193

[56] References Cited

U.S. PATENT DOCUMENTS

| | | | |
|---|---|---|---|
| 2,836,994 | 6/1958 | Weber | 74/796 |
| 4,232,561 | 11/1980 | Kashihara et al. | 74/191 |
| 4,332,542 | 6/1982 | Matsui | 425/459 |
| 4,643,046 | 2/1987 | Kaneyuki | 74/796 X |
| 4,730,515 | 3/1988 | Kaneyuki | 74/796 X |
| 4,738,164 | 4/1988 | Kaneyuki | 74/796 |
| 4,751,854 | 6/1988 | Sakai et al. | 74/796 |

FOREIGN PATENT DOCUMENTS

| | | | |
|---|---|---|---|
| 595443 | 4/1960 | Canada | 74/796 |
| 129461 | 7/1985 | Japan | 74/796 |
| 266861 | 11/1986 | Japan | 74/796 |
| 72962 | 4/1988 | Japan | 74/496 |

Primary Examiner—Dwight Diehl
Attorney, Agent, or Firm—Burns, Doane, Swecker & Mathis

[57] ABSTRACT

A stepless speed change traction gear includes a plurality of conical rollers, each having a conical surface frictionally engaging with an internal surface of a speed changing ring, a flat surface perpendicular to the axis of the conical surface frictionally engaging a non-rotating track ring, and an annular concave surface coaxial with the conical surface and frictionally engaging a bearing ring. The speed changing ring is longitudinally adjustable between limits so that a speed ratio range from 0 to nearly 1.0 is developed. This traction gear is not provided any additional gearing or speed increasing device to widen the speed range. A clutch, brake, and operator can permit a direct drive condition between the input and output shafts.

7 Claims, 2 Drawing Sheets

STEPLESS SPEED CHANGE TRACTION GEAR

BACKGROUND OF THE INVENTION

The present invention relates to a stepless speed change traction gear for use with various vehicles, squeezers, centrifugal separators and the like. More specifically, the present invention generally concerns a stepless speed change traction device which includes conical rollers.

DESCRIPTION OF RELATED ART AND CURRENT PROBLEMS

Various applications exist where it is desirable to use a stepless speed change traction gear of Japanese patent No. 1,120,097 disclosed in Japanese patent application bulletin No. 13,221/1982, UK Patent No. 2,002,066, West German Patent No. 2,825,730 and U.S. Pat. No. 4,232,561, which is capable of generating a particularly large starting torque. However, the range of speed ratios for the known devices is relatively small, in the range of 0 to about 0.5, where speed ratio is the quotient of output shaft speed/input shaft speed. Therefore, in the past when a range of speed ratios greater than 0 to about 0.5 is required, together with a generation of high starting torque, a speed increasing device for the traction gear has been used.

One particular difficulty with known speed change traction gears has been the difficulty of changing from a condition or state of traction drive to a condition or state of direct drive. That change has only been possible in the past when the speed ratio range of the speed change traction gear includes a point wherein the speed ratio between the input shaft and the output shaft is equal to 1.0 or nearly equal to 1.0. Such a speed ratio is a necessary condition for enabling direct coupling of the output shaft and the input shaft. However, when this necessary condition for direct coupling is accomplished by providing speed increasing gear means which multiplies a speed ratio range of 0 to 0.5 to that of 0 to 1.0, then the magnitude of torque which can be generated from a given power source is reduced to $\frac{1}{2}$, due to the inclusion of the speed increasing gear means.

Speed increasing means devices also cause various other disadvantages in a stepless speed change traction gear arrangement including, for example, construction complications, size increases, additional noise sources, reduced mechanical efficiency, and cost increases.

It would, therefore, be desirable to provide a stepless speed change traction gear arrangement which overcomes these, as well as other, problems and disadvantages.

SUMMARY OF THE INVENTION

A stepless speed change traction gear according to the present invention includes a plurality of conical rollers, each of which is provided with a conical surface frictionally engaging an internal surface of a speed changing ring, a flat surface perpendicular to the axis of the conical surface, and an annular concave surface provided coaxially with the conical surface. Each conical roller may be rotatably supported by a corresponding shaft carried by a holder that, in turn, is drivingly connected to an input shaft of the traction gear.

A track ring frictionally engages the flat surface of the conical rollers. A reaction bearing ring bears against the annular concave surface to react both the force acting between the track ring and the conical roller and the force acting between the speed changing ring and the conical rollers. The speed change ring is drivingly connected to the output shaft. A range of speed ratio from zero to nearly 1.0 may be provided between the output shaft and the input shaft.

Power is transmitted through the above-mentioned traction gear in accordance with the present invention following a path from the input shaft to the holder, then to the shafts carried by the holder, next through the conical rollers, to the speed changing ring, and the output shaft. With this arrangement, the lower limit of the speed ratio, $R_{min}$, is zero or nearly zero, and the maximum value of the speed ratio, $R_{max}$, is about 1.0, where $R=N_2/N_1$, $N_1$ is the input speed, and $N_2$ is the output speed. The state or condition corresponding to $R_{min}$ can be obtained when the frictionally engaging point between the conical roller and the speed changing ring is near the bottom of the conical surface, while the state or condition of $R_{max}$ can be obtained when the frictionally engaging point between the conical roller and the speed changing ring is near the apex of the conical surface.

In situations where it is desired to also have a speed change traction gear which can operate in a directly driven condition, it is also possible to provide a clutch arrangement between the input shaft and the output shaft. Where a brake mechanism is also provided to keep the track ring from rotating, and a suitable valve mechanism is provided, then by deactivating the brake and energizing the clutch, a direct drive condition is obtained. Conversely, when the brake is energized and the clutch is deactivated, a variable speed drive condition is obtained.

BRIEF DESCRIPTION OF THE DRAWINGS

Many objects and advantages of the present invention will be apparent to those skilled in the art when this specification is read in conjunction with the attached drawings wherein like reference numerals are applied to like elements and wherein.

DETAILED DESCRIPTION OF PREFERRED EMBODIMENTS OF THE INVENTION

Figure 1:
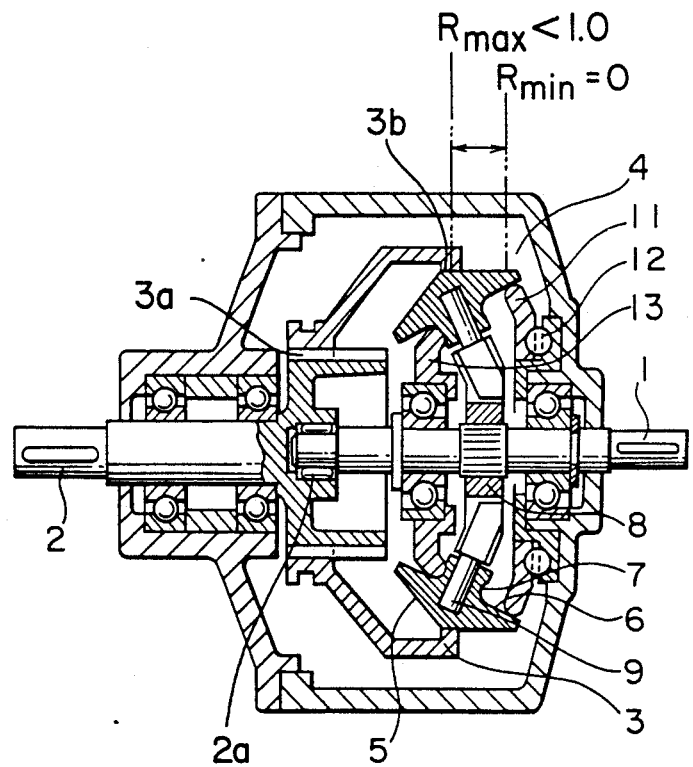
FIG. 1 is a longitudinal cross-sectional side view of a speed change traction gear according to the present invention.

Referring now to FIG. 1, a stepless speed change traction gear has a housing with an input shaft 1 projecting from one end and an output shaft 2 projecting from the opposite end. The input shaft 1 has an axis and the output shaft 2 has an axis which is in general coaxial alignment with axis of the input shaft. Suitable conventional bearing support the input shaft 1 relative to the housing. Likewise, suitable conventional bearings support the output shaft 2 relative to the housing. If desired, an intershaft bearing 2a may be provided between the end of the input shaft 1 and the end of the output shaft 2 to provide further support for those shafts and to assure the alignment between them.

A speed changing ring 3 is disposed within the housing and is drivingly connected to the output shaft 2 by a suitable spline arrangement 3a which allows the speed changing ring 3 to move longitudinally relative to the output shaft 2. The ring 3 has an internal annular surface 3b which faces radially inwardly.

Also disposed within the housing are a plurality of conical rollers 4. For the device of FIG. 1, five conical rollers 4 are provided. Each conical roller has a conical surface 5 with an axis, a flat or nearly flat surface 6 arranged generally perpendicular to the axis of the conical surface 5, and a concave annular surface 7 concentric to the conical surface 5. A portion of the conical surface of each roller is arranged so as to be generally parallel to the axis of the input shaft 1. That surface portion frictionally engages the inner surface 3b of the speed changing ring 3.

Figure 2:
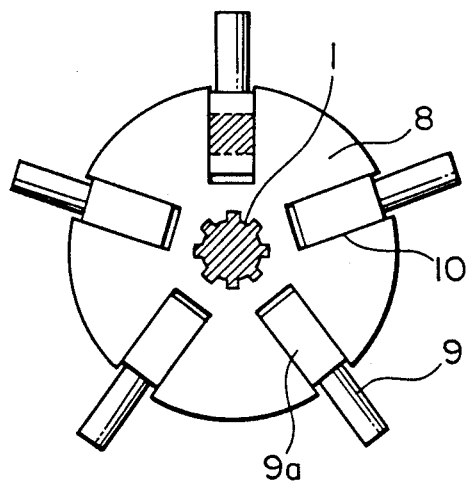
FIG. 2 is an end view of the holder and supporting shafts for the conical rollers of the speed change traction gear of FIG. 1; and, FIG. 3 is a longitudinal cross-sectional side view of invention which is provided with a clutch, brake, and valve to provide a direct drive condition.

Each conical roller 4 is rotatably supported on a corresponding supporting shaft 9 arranged in a holder 8 connected to the input shaft 1. The holder 8 is located within the housing and mounts the supporting shafts 9 so that they orbit the axis of the input shaft 1. As best seen in FIG. 2, the supporting shafts 9 are radially arranged and equiangularly disposed in the holder 8. As shown, the holder 8 has a plurality of equiangularly arranged radial slots 10, each extending towards the center of the input shaft 1. Each supporting shaft 9 is provided with a portion 9a having two sides which are chamfered so as to be flat and parallel. This portion 9a of each shaft 9 fits into a corresponding one of the radial slots 10 on the holder 8 so as to be freely slidable therein.

As viewed in FIG. 2, that is, in a plane generally perpendicular to the axis of the input shaft 1, each support shaft 9 has an axis which extends radially. However, as seen in FIG. 1, when viewed in a cross section through the input shaft axis, the axis of each support shaft 9 intersects the axis of the input shaft 1 and is inclined to the axis of the input shaft by an angle which is the same as the angle defined between the axis of the conical roller 4 and the conical surface of that conical roller 4. With this arrangement, the portion of the conical surface can be maintained substantially parallel to the axis of the input shaft 1.

A track ring 11 is supported by the housing so as to be rotationally fixed. The track ring 11 frictionally engages the flat surface 6 of each conical roller 4. A camtype contact pressure generating device 12 is provided between the housing and a rear portion of the track ring 11. The device 12 urges or biases the track ring 11 into intimate contact with the flat surface 6 of the conical rollers 4.

A reaction bearing ring 13 is rotatably supported by a suitable conventional bearing on the input shaft 1 within the housing. The reaction bearing ring 13 bears against annular concave surface of the conical rollers 4 and reacts the force acting between the track ring 11 and the conical rollers 4 as well as the force acting between the speed changing ring 3 and the conical rollers 4.

Thus, it will be seen that each conical roller 4 is held at three points: a point on the speed changing ring 3, a point on the track ring 11, and a point on the reaction bearing ring 13.

The portion 9a of the supporting shaft 9 fitted into the corresponding radial slot 10 of the holder does not interfere the three point suspension of each conical roller 4. Rather, that portion 9a of the supporting shaft 9 cooperates with the holder 8 to prevent tilting of the associated conical roller 4 towards the direction of revolution of the holder 8.

The limits of longitudinal travel of the speed change ring 3 are selected so that the desired range of the speed ratio, R, is obtained. For the present invention, the limits of that longitudinal travel are selected so that the speed ratio, R, can vary between a minimum of 0 to a maximum value near to 1.0. For example, a value of 0.95 as a maximum would be suitable.

Figure 3:
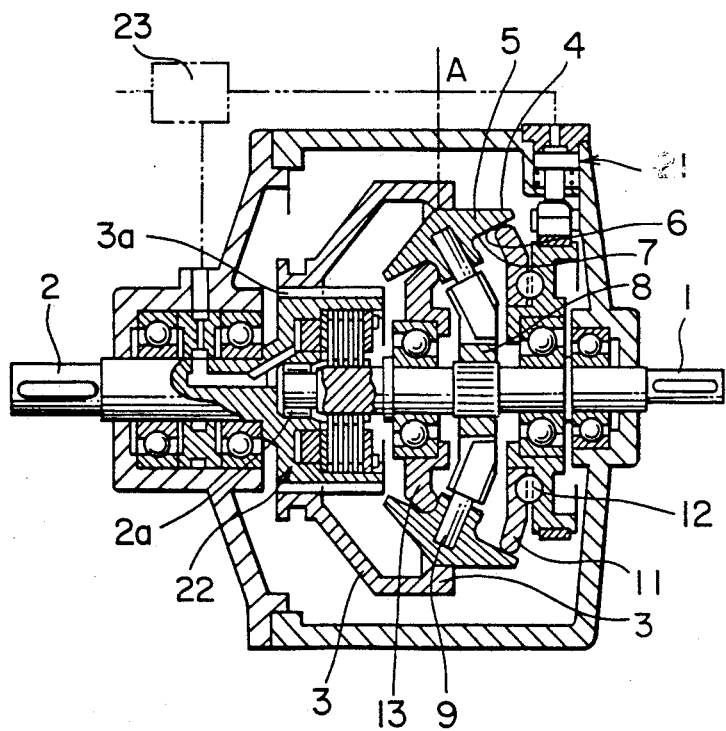

FIG. 3 shows another embodiment of the present invention wherein the output shaft 2 of the traction gear of FIG. 1 is capable of being directly connected to the input shaft 1 utilizing the condition $R_{max}$ nearly equal to 1.0. Hereafter, the condition wherein the output shaft 2 is directly connected to the input shaft 1 and the condition wherein the output shaft 2 is connected to the input shaft 1 through traction drive mechanism will be referred to by the terms "D drive state" and "V drive state", respectively. Further, in FIG. 3, the same numerals used in FIG. 1 are used to refer to corresponding parts for which the description given above will not be repeated. The main difference between the traction gear of FIG. 1 and that of FIG. 3 is the provision of a braking device 21 (see FIG. 3) and a clutch 22. The braking device 21 is operable an operable portion of the attachment of the track ring 11 to the housing. The braking device 21 keeps the track ring 11 stationary with respect to the housing in the "V drive state" and permits relative rotation between the track ring 11 and the housing in the "D drive state".

When engaged, the clutch 22 is provided to directly connect the output shaft 2 to the input shaft 1 so as to make a "D drive state". When disengaged, the clutch 22 does not interfere with relative rotation between the input shaft 1 and the output shaft 2.

An oil-passage-change-over-device 23, such as a two position four way valve, may be provided to shift from the "V drive state" to the "D drive state" and alternately engage the braking means 21 and the clutch 22. When the speed changing ring 3 reaches the position "A" where the maximum speed ratio is nearly 1.0, the oil-passage-change-over-device 23 is actuated to release the braking device 21 and simultaneously engage the clutch 22 so that the output shaft 2 is directly connected to the input shaft 1. The speed changing ring 3 is always held on the position "A" in a "D drive state".

When the traction gear reaches a state or condition where the "V drive state" should be selected, then the device 23 is actuated to disconnect the clutch 22 and simultaneously energize the braking device 21.

The device to move the speed changing ring 3 is one which is well known and it is omitted from the figures only to avoid complication of them and thereby promote clarity.

The present invention provides a novel speed change traction gear which simultaneously satisfies a first condition where it is capable of generating large torque at low speed and a second condition where its range of speed ratio includes a point on which the value of the speed ratio is near to 1.0. Further, the present invention provides a novel stepless speed change traction gear which is shiftable between a "V drive state" and a "D drive state", without accompanying disadvantages such as construction complications, enlarged outside dimensions, additional noise sources, and reduced mechanical efficiency, all of which can be caused by use of speed increasing gearing used in conjunction with a stepless speed change traction gear.

It will now be apparent that a novel stepless speed change traction gear has been described which overcomes the problems of the type discussed. Moreover, it will be apparent to those skilled in the art that numerous modifications, variations, substitutions, and equivalents may be substituted for the various features of the invention. Accordingly, it is expressly intended that all such modifications, variations, substitutions, and equivalents which fall within the spirit and scope of the invention as defined by the appended claims be embraced thereby.

What is claimed is:

1. A stepless speed change traction gear comprising:
   a housing;
   an input shaft extending from the housing, having an axis, and operable at a first rotational speed, m $N_1$;
   an output shaft generally aligned with the input shaft, extending from the housing, and operable at a second rotation speed, $N_2$;
   a longitudinally slidable speed changing ring, mounted on the output shaft within the housing, and including an internal surface;
   a shaft holder drivingly connected to the input shaft within the housing;
   a plurality of generally radially extending support shafts carried by the shaft holder to orbit the input shaft;
   a plurality of conical rollers, each of which is supported on a corresponding one of the support shafts and each of which is provided with:
   a conical surface having an axis, at least a portion of the conical surface being parallel to the axis of the input shaft, the conical surface frictionally engaging the internal surface of a speed changing ring,
   a flat surface generally perpendicular to the axis of the conical surface, and
   an annular concave surface generally coaxial with the conical surface;
   a track ring attached to the housing so as to be rotationally fixed, frictionally engaging the flat surface of each conical roller; and
   a reaction bearing ring which bears against the annular concave surface of the conical rollers and is operable to react a force acting between the track ring and the conical rollers together with a force acting between the speed changing ring and the conical rollers; and
   the speed change ring being movable along the conical surfaces of the conical rollers to provide a range of speed rations from about zero to nearly 1.0, where the speed ratio is defined as $N_2/N_1$
   wherein the shaft holder has a plurality of generally radially oriented slots, and wherein a portion of each support shaft is freely slidable in a corresponding one of the radially oriented slots.

2. The stepless speed change traction gear according to claim 1 further including a braking means for attaching the track ring to the housing, a clutch operable to connect the input shaft directly with the output shaft, and means for alternately engaging either the braking means or the clutch, the clutch being engageable when the speed ratio R between the output shaft and the input shaft nearly reaches its maximum value of nearly 1.0.

3. The stepless speed change traction gear according to claim 1 further including means acting between the housing and the track ring to bias the track ring into engagement with the conical rollers.

4. The stepless speed change traction gear according to claim 1 wherein the input shaft and the output shaft are supported relative to one another by an intershaft bearing.

5. The stepless speed change traction gear according to claim 1 wherein the speed change ring is drivingly connected to the output gear by a splined connection.

6. The stepless speed change traction gear according to claim 1 wherein each support shaft has an axis which intersects the axis of the input shaft, which extends radially when viewed in a plane perpendicular to the axis of the input shaft, and which is inclined to the axis of the input shaft by an angle which is the same as the angle defined between the axis of the conical roller and the conical surface of that conical roller.

7. The stepless speed change traction gear according to claim 1 wherein the slots of the shaft holder are equiangularly disposed.

* * * * *